United States Patent [19]
Mendler

[11] Patent Number: 5,819,702
[45] Date of Patent: Oct. 13, 1998

[54] HIGH EFFICIENCY VEHICLE AND ENGINE

[75] Inventor: Charles Mendler, Washington, D.C.

[73] Assignee: NGV Technologies, Inc., Washington, D.C.

[21] Appl. No.: 443,164

[22] Filed: May 17, 1995

[51] Int. Cl.⁶ .................................................. F02B 75/02
[52] U.S. Cl. ........................ 123/311; 123/1 R; 123/200; 123/46 R; 123/65 R
[58] Field of Search .................................... 123/1 R, 200, 123/46 R, 65 R, 311

[56] References Cited

U.S. PATENT DOCUMENTS

| | | |
|---|---|---|
| 2,773,490 | 11/1956 | Miller . |
| 2,780,912 | 2/1957 | Miller . |
| 2,817,322 | 12/1957 | Miller . |
| 4,033,304 | 7/1977 | Luria ...................................... 123/78 A |
| 5,255,637 | 10/1993 | Schechter .............................. 123/48 R |

OTHER PUBLICATIONS

"Inventions Needed for PNGV", U.S. Department of Commerce, Mar., 1995 pp. 1–17.

"PNGV Program Plan", U.S. Department of Commerce, Jul. 1994. pp. 1–21.

"The USDOE Vehicle Propulsion Research and Development Program", Transportation and Global Climate Change, ACEEE, Jan. 1993, pp. 159–187.

"Automotive Fuel Economy", National Research Council, National Academy Press, Washington, D.C., Jan. 1992, pp. 196–226.

Hitomi, Mitsuo, et al., "Mechanism of Improving Fuel Efficiency by Miller Cycle and its Future Prospect", SAE paper 950974, Jan. 1995, pp. 1–7.

Dopson, C., et al., "Powertrain Systems Definition Process", SAE paper 950811, Jan. 1995, pp. 131–143.

Schechter, M.M., et al., "The Otto–Atkinson Cycle Engine Fuel Economy & Emissions Results and Hardware Design", SAE paper 950089, Jan. 1995, pp. 1–13.

Milburn, Ski Muir, "Introducing a High Efficiency Variable Positive Displacement Automotive Supercharger", SAE paper 940845, Jan. 1994, pp. 1–11.

Goto, Tsuyoshi, et al., "Development of V6 Miller Cycle Gasoline Engine", SAE paper 940198, Jan. 1994, pp. 11–19.

Kentfield, J.A.C., "A Simple Variable Expansion–Ratio, Spark Ignition, Four–Stroke, Engine", SAE paper 932874, Jan. 1993, pp. 1–10.

Chopra, Avtar S., et al., "An Experimental Single Cylinder ECCLINK VCR Engine", SAE paper 921695, Jan. 1992, pp. 1–11.

Blakey, S.C. et al., "A Design and Experimental Study of an Otto Atkinson Cycle Engine Using Late Intake Valve Closing", SAE paper 910451, Jan. 1991.

Larsen, G.L., "Research Engine for Evaluating the Effects of Variable Compression Ratio (VCR) and/or Variable Timing (VVT)", SAE paper 910053, Jan. 1991, pp. 1–15.

Ashley, C., "Variable Compression Pistons", SAE paper 901539, Jan. 1990, pp. 1, 3, 5, 7, 9, 11 and 13.

Wirbeleit, F.G., et al., "Development of Pistons with Variable Compression Height for Increased Efficiency and Specific Power Output of Combustion Engines", SAE paper 900229, Jan. 1990, pp. 1–15.

(List continued on next page.)

Primary Examiner—David A. Okonsky
Attorney, Agent, or Firm—Lane, Aitken & McCann

[57] ABSTRACT

The efficiency of a vehicle having a body and a reciprocating piston four-stroke internal combustion engine is increased substantially by greatly reducing the size of the engine relative to the weight of the body. The great reduction in engine size relative to the weight of the body causes the engine to operate in a much more efficient range during almost all of the time of its operation. Peak power needs are satisfied by turbocharging and varying the compression ratio.

9 Claims, 10 Drawing Sheets

OTHER PUBLICATIONS

Heywood, John B., et al., "Development and Evaluation of a Friction Model for Spark–Ignition Engines", SAE paper 890836, Jan. 1989, pp. 1–21.

Sauders, R.J., et al., "Variable Valve Closure Timing for Load Control and the Otto Atkinson Cycle Engine", SAE paper 890677, Jan. 1989, pp. 1–11.

Stone, Richard, et al., "Variable Valve Actuation Mechanisms and the Potential for their Application", SAE paper 890673, Jan. 1989, pp. 1–17.

Gray, C., "A Review of Variable Engine Valve Timing", SAE paper 880386 Jan. 1988, pp. 1–11.

Adams, W.H., et al., "Analysis of the Combustion Process of a Spark Ignition Engine with a Variable Compression Ratio", pp. 1, 3, 5, 7, 9, SAE paper 870610, Jan. 1987.

Singer, David A., "Comparison of a Supercharger vs. a Turbocharger in a Small Displacement Gasoline Engine Application" SAE paper 850244, Jan. 1985, pp. 9–16.

Luria, D., et al., "The Otto–Atkinson Engine—A New Concept in Automotive Economy", SAE paper 820352, Feb. 1982, pp. 1–7.

Ansdale, R.F., "A Reconnaissance of Supercharging Technology 1902–1980" SAE paper 810003, Jan. 1981, pp. 1–15.

Porter, F.C., "Design for Fuel Economy—The New GM Front Drive Cars", SAE paper 790721, Jun. 1979, pp. 1–10.

May, Michael G., "Lower Specific Fuel Consumption with High Compression Lean Burn Spark Ignition 4 Stroke Engines", SAE paper 790386, Jan. 1979.

Pouliot, H.N., et al., "A Variable–Displacement Spark–Ignition Engine" SAE paper 770114, Feb. 1977, pp. 1–19.

Grundy, J.R., et al., "A VCR 1360–2 High Specific Output Variable Compression Ratio Diesel Engine", SAE paper 760051, Jan. 1976, pp. 1–22.

Stone, Richard, "Motor Vehicle Fuel Economy", Macmillan Education Ltd., pp. 111–115, Jan. 1989.

Heywood, John B., "Internal Combustion Engine Fundamentals", McGraw–Hill Book Co., pp. 718–722, Jan. 1988.

Watson, N., et al., "Turbocharging the Internal Combustion Engine" pp. 442–445, John Wiley & Sons, Jan. 1982.

Popular Science, "Two Pistons In One", p. 24, Dec. 1994.

Popular Science, "Emerging Technologies for the Supercar", pp. 95–101, Jun., 1994.

Autoweek, "Bright, Light Little Jewel", p. 24, May 4, 1992.

Basiletti John C., et al., "Recent Developments in Variable Compression Ratio Engines" SAE paper 660344, Jan. 1966, pp. 27–40.

Wallace, W.A., et al., "A variable Compression Ratio Engine Development", SAE paper 762A, Oct. 1963, and SAE paper 640060, Jan. 1964, pp. 680–707.

Wallace, W.A., et al., "VC–Ratio Engine", SAE Journal, pp. 82–86, Jan. 1964.

Caris, D.F., et al., "A New Look at High Compression Engines," SAE paper 590015, Aug. 1958. pp. 1–16.

Automotive Engineering, pp. 49–54, SAE, Jan. 1994.

Automotive Engineering, pp. 60–62, SAE, Dec. 1992.

Tech Briefs, Automotive Engineering, vol. 99, No. 10, Oct. 1991.

Ladommatos, N., et al., "Developments for Direct Injection Diesel Engines", Practical Limits of Efficiency of Engines, pp. 41–52, Mechanical Engineering Publications Ltd., Jan. 1986.

Saunders, R.J., "Part Load Efficiency in Gasoline Engines", Practical Limits of Efficiency of Engines, pp. 55–62, Mechanical Engineering Publications Ltd., Jan. 1986.

Rosenkranz, H.G., et al., "Driveability, fuel consumption and emissions of a 1.3 litre turbocharged spark ignition engine developed as replacement for a 2.0 litre naturally aspirated engine" IMechE paper C118/86, Jan. 1986.

Stone, Richard, "Introduction to Internal Combustion Engines" Second Ed., pp. 351–352, SAE, Jan. 1992.

Seiffert, Ulrich et al., "Automobile Technology of the Future" pp. 101–106, SAE Jan. 1991.

HIGH EFFICIENCY VEHICLE AND ENGINE

BACKGROUND OF THE INVENTION

The present invention relates to a system for improving the fuel economy of vehicles, and more specifically to a system for improving the low-load efficiency of automotive spark-ignition four-stroke internal-combustion engines.

The maximum power capability of typical vehicle engines is significantly greater than the average power actually used while driving. On average, new cars sold today in the United States can deliver a maximum power of approximately 100 kilowatts. For most drivers, however, the average power actually used during city and highway driving is approximately 10 kilowatts. This can be appreciated from the stepped line in prior art FIG. 1, in which engine power output is shown on the abscissa, or horizontal, axis, and the percent of total driving time spent at a given engine power level for a typical driver and vehicle is read from the left ordinate axis. The low average power use is a problem, because conventional vehicle engines have poor efficiency when operated at light power levels. Since vehicle engines are operated most of the time at light power levels, fuel economy is poor. The efficiency of a typical prior art vehicle engine relative to engine power output is shown by the curved line in FIG. 1, in which brake engine efficiency is read from the right ordinate axis. As can be appreciated from FIG. 1, prior art engines are operated at low efficiency most of the time.

The problem of poor light load engine efficiency has been known for some time. In 1958 the Society of Automotive Engineers (SAE) published "Determination of True Engine Friction," SAE Trans., Vol. 66, pp. 649–661 which deals with engine friction losses, which are an important cause of poor light-load engine efficiency. Engine friction losses, which include mechanical sliding friction and aerodynamic pumping losses have only marginally improved since 1958. Today, typical new midsize passenger cars have an engine efficiency of approximately 18.2% during urban driving and 25.6% during highway driving, according to the 1994 Program Plan of Partnership for a New Generation of Vehicles (PNGV), a United States government and industry partnership including the major U.S. automobile manufacturers.

The PNGV was formed in 1993 to attempt development within ten years of one or more production prototype vehicles having a fuel economy of up to three times that of today's passenger cars. Methods of significantly increasing fuel economy are described in "The USDOE Propulsion Research and Development Program", *Transportation and Global Climate Change,* 1993, and in "Inventions Needed", PNGV, March 1995. Fuel economy and exhaust emission levels can be improved with a hybrid powertrain. Hybrid vehicles are characterized as having one, typically very small, engine that efficiently generates for the vehicle the base load power requirement of approximately 10 kilowatts. In hybrid vehicles, the base load engine is unable to deliver the maximum power requirements of the vehicle. Consequently, a second engine or motor is employed to permit the hybrid system to deliver maximum power needs. Problems with hybrid power systems include the cost of two power sources, complexity and bulk.

FIG. 3 shows generally engine size relative to vehicle weight for various types of vehicles. Vehicle weight divided by engine cylinder displacement, W/D in units of kilograms per liter, is shown on the abscissa axis. Engine maximum power output divided by engine cylinder displacement P/D, in units of kilowatts per liter, is shown on the ordinate axis. A vehicle power to weight ratio of 0.055 kW/kg is represented by the line E, which indicates generally the lower bound of power and thus acceleration for vehicles sold today in the United States. Thus, this is considered to be the minimum ratio for providing suitable acceleration. Some very low power European city cars fall below line E. Race and exotic performance cars fall in area A of the diagram; conventional passenger cars are in area B; Japanese micro cars fall in area b; and hybrid vehicles described above fall in area C. All, or virtually all, passenger cars sold world wide and having a vehicle power to weight ratio greater than 0.055 kW/kg are in areas B and b. The curved line T is intended to represent the historical trade-off of power vs. efficiency for vehicle engines, from vehicles having high fuel economy in the lower right of the diagram, to vehicles having high performance in the upper left corner of the diagram. The area C, which generally represents the primary engines of hybrid vehicles, is below line E. Consequently, hybrid vehicles require a secondary engine in order to provide the power to weight ratio and acceleration of vehicles sold today in the United States. As stated above, this secondary power source adds significant cost, complexity and bulk to the vehicle.

FIG. 4 is similar to FIG. 3, except that it shows on the abscissa axis a ratio of compression ratio times vehicle weight to combustion chamber volume Cr(W/d), rather than vehicle weight to engine cylinder displacement, W/D. In general, FIG. 5 relates to the combustion chamber volume rather than the cylinder displacement, and thus more precisely indicates automobile fuel economy than FIG. 3. Cr is the maximum compression ratio of the engine and d is the minimum combustion chamber volume of the engine. All passenger cars shown in FIG. 3 and having a vehicle power to weight ratio greater than 0.055 kW/kg are shown in FIG. 4. Dot H represents one hybrid vehicle, and is located below line e. As stated above, hybrid vehicles require a secondary engine in order to provide the power to weight ratio and acceleration of vehicles sold today in the United States. This secondary power source adds significant cost, complexity and bulk to the vehicle.

In a laboratory environment, direct injection diesel engines have demonstrated potential for attaining fuel efficiencies approximately as high as those of hybrid powertrains. While it may be possible to attain the PNGV mileage objectives with an advanced diesel engine, the exhaust emission levels of these diesel engines are unacceptable.

Another approach that has been attempted for improving non-hybrid powertrain engine efficiency is variable compression ratio. A variable compression ratio systems tested by Volkswagen is described in SAE paper No.870610. Variable compression ratio systems with variable valve timing are described in U.S. Pat. No. 5,255,637 issued to M. M. Schechter, and in SAE paper No. 950089, February 1995, by M. M. Schechter et al., and in *Automobile Technology of the Future*, pp. 101–106, SAE, 1991. Variable compression ratio mechanism have been known for some time, and are described in SAE paper No. 640060, published in 1963, and SAE paper No. 901539 published in 1990. The general type of variable compression ratio mechanism used by Schechter was invented by the British Internal-Combustion Engine Research Institute (BICERI) in circa 1959. In prior art spark-ignition variable compression ratio engines, compression ratio is increased at light loads where the tendency of an engine to knock is at a minimum. Since thermodynamic efficiency increases with increasing compression ratio, one would expect increasing the compression ratio to increase light-load engine efficiency. However, the combustion chamber surface area to volume ratio also increases, which results in higher combustion chamber heat loss levels, which can be appreciated from prior art FIG. 10. Prior art FIG. 10 shows combustion chamber surface area on the vertical axis and engine power output at a certain engine speed on the horizontal axis. The surface area to combustion chamber volume ratio of typical vehicle engines is represented by cross hatched box 100. The surface area to combustion chamber volume ratio of a variable compression ratio engine is represented by line 102. As can be appreciated from FIG. 10, at light power levels, combustion chamber surface area increases significantly for these variable compression ratio engines, which results in increased heat loss from the combustion chamber, which adversely effects vehicle fuel economy. Also in these variable compression ratio engines, there is only minimal reduction of mechanical sliding frictional power loss and little or no reduction of aerodynamic pumping loss. Consequently, variable compression ratio has provided only limited gains in engine efficiency and vehicle fuel economy.

This efficiency can be improved somewhat by employing variable valve control, which reduces aerodynamic pumping loss and which provides the engine with a greater effective expansion ratio than effective compression ratio at light loads. Engines employing both variable compression ratio and variable valve control, described in SAE paper No. 820352, 1982, and SAE paper No. 950089, and in *Automotive Technology of the Future*, have been known for some time and are referred to generally as OA engines because they operate under the Otto-cycle at high load to attain high power output, and under the Atkinson cycle at light load to attain high efficiency. OA engines have demonstrated light load fuel economy improvement of approximately 12 to 15%. This is a small increase in fuel economy relative to the increased cost of the engine.

In U.S. Pat. No. 5,255,637 the variable compression ratio engine has the same displacement as a conventional turbo-charged engine but includes variable valve control with the turbocharging. It discloses that variable valve control permits elimination of the waste gate and turbocharging increases engine power, but at the expense of efficiency. This arrangement addresses the consumer interest of increased power with minimized loss of fuel economy, described in SAE paper No. 901539.

A further problem with variable compression ratio engines is that of increased hydrocarbon emission levels caused by heat loss from the combustion charge, which results in incomplete combustion of the fuel-air mixture. These engines have high heat loss because of the high surface area to volume ratio of the combustion chamber at light engine loads, as shown in FIG. 13. SAE paper No. 950089, discloses a 24% to 60% increase in hydrocarbon emissions with its variable compression ratio engine. It should be noted that a 50% reduction in hydrocarbon emissions is required for current Tier I automobiles to attain the Tier II hydrocarbon emissions targets, and approximately an 80% reduction in hydrocarbon emissions to attain the California ULEV emission standard which takes effect in 1997. Hydrocarbon emissions are most sever during engine starting because the engine is cold and the catalytic converter is below its light off temperature. Yet a further problem with prior art variable compression ratio engines is that of transient engine knock. Specifically, rapid reduction of compression ratio, from for example 15:1 to 9.5:1, is important for avoiding transient knock. SAE paper No. 950089 discloses that "the most critical piece of hardware needed to create the OA engine is the VCR [variable compression ratio] piston. A VCR piston was built and tested, and although it did function, the response rate was slower than required. Significant development is needed to resolve issues." Because of the problem of transient engine knock, these variable compression ratio engines require a faster acting variable compression ratio mechanism.

It has been known that engine efficiency can be improved by reducing the size of the engine relative to the size of the vehicle. This has the effect of operating the engine at a higher load, where friction losses are relatively lower. The National Research Council reports in Automotive Fuel Economy, National Academy Press, 1992, pp. 2046–205, that a 10% reduction in size of a conventional engine yields a fuel economy improvement of approximately 3.2%. Similarly, SAE paper No. 940198 shows (in FIG. 13 of the paper) that a 10% reduction in engine size yields approximately a 4.3% improvement in fuel economy, and SAE paper No. 950811 shows that a 10% reduction in engine size yields a fuel economy improvement of approximately 3.4%. These values are very close to one another given the variability, such as cylinder count, of engine configurations. A 3.2% to 4.3% gain in fuel economy for a 10% percent reduction in engine size is a relatively small improvement.

Of course, a problem with reducing engine size is that power is also reduced. Engine power can be recovered by increasing air intake through the use of more than the standard one intake valve and one exhaust valve per cylinder. However, this approach enables only a limited reduction in engine size, approximately 10%, with out loss of power. Approximately an additional 2.0% gain in efficiency is realized with the four valve per cylinder engine, however, due to better spark plug placement. While this is a valuable improvement in fuel economy, reducing engine size by more than approximately 10% would compromise vehicle power and acceleration. It has been known for some time that the power of an internal combustion engine can be increased by turbocharging or supercharging. Turbocharging of a spark-ignition internal combustion engine requires the compression ratio to be reduced in order to avoid knock. Lowering the compression ratio, however, reduces thermodynamic efficiency, which offsets efficiency gains realizable from using a smaller engine. Accordingly, the benefit of engine downsizing becomes smaller, and of less or no value, with each additional incremental reduction of engine size. Consequently, turbocharging is expensive relative to the amount of fuel economy improvement that is realized by engine downsizing. In SAE paper No. 950811, March 1995, Lotus Engineering discusses technologies that enable engine size reduction for improved fuel economy. Lotus Engineering does not recommend use of turbocharging for improving fuel economy. According to Lotus Engineering, an additional problem with turbocharging is that fuel enrichment is currently employed to prevent overheating of the turbocharger during periods of high power output, and that this fuel enrichment produces high emission levels. Turbine overheating and the need for fuel enrichment can be avoided or delayed by water cooling the turbocharger and/or using a ceramic turbine, but these options add cost. Accordingly, turbocharging is expensive relative to the amount of fuel economy improvement realized.

SUMMARY OF THE INVENTION

By the present invention, a reciprocating piston, four-stroke spark-ignition internal-combustion engine, much smaller than conventional for the size of the vehicle, is employed in the vehicle for attaining high efficiency, and is power-boosted for attaining maximum power. The powerboosting includes supercharging the engine and varying the compression ratio. The engine is much smaller in overall dimensions, weight, engine cylinder displacement and combustion chamber volume. The present invention is especially applicable to passenger cars and light trucks.

The cost of the small variable compression ratio supercharged engine is significantly less than the cost of an additional motive power source and associated powertrain which are used in hybrid vehicles, and is competitive in price with conventional engines of comparable power.

The size of the engine is greatly reduced relative to the size of the vehicle in order to minimize the effect of engine friction losses and to maximize vehicle fuel economy. Supercharging and variable compression ratio are employed to satisfy maximum power requirements without detracting from light load engine efficiency. The variable compression ratio supercharged engine attains approximately the same fuel economy as the hybrid vehicle's primary engine in the same automobile, but at significantly less cost, complexity, weight and bulk than the hybrid system.

As can be appreciated from FIG. 5, no, or virtually no, supercharged spark-ignition passenger car engines are sold anywhere that have a compression ratio times vehicle weight to combustion chamber displacement ratio $Cr(W/d)$ greater than 75000 kg/L and a power to weight ratio greater than 0.055 kW/kg, because the cost of the supercharging equipment adds significantly to the cost of the engine, and the fuel economy benefit from downsizing these supercharged engines is small. Accordingly, the ratio of the cost of downsizing with supercharging to the fuel economy benefit from engine downsizing is poor for prior art passenger car engines.

Referring now to FIG. 9, supercharged engines employing variable compression ratio, line 94, are unusual in that the rate of efficiency improvements realized by engine downsizing grows rather than levels off as is the case with conventional supercharged engines, line 90. The variable compression ratio supercharged engine of the present invention hopes to attain up to approximately 60% better fuel economy than conventional spark ignition vehicle engines in the same automobile. The engine of the present invention is much smaller than conventional engines for the same vehicle in order to attain optimum fuel economy and a good downsizing cost to fuel economy benefit ratio.

The five significant problems associated with prior art variable compression ratio engines—high heat loss from the combustion chamber due to the chamber's high surface area to volume ratio, no significant reduction in mechanical sliding friction, high cost, transient engine knock, and hydrocarbon emissions—are avoided by varying the compression ratio of a small engine, rather than increasing the light-load efficiency of a conventional size engine.

Due to its small cylinder displacement and small combustion chamber volume, at light power levels, the engine according to the present invention will operate approximately as efficiently as a hybrid vehicle's primary engine. As can be appreciated from FIGS. 4 and 14, the combustion chamber has a favorable surface area to volume ratio and the geometry of the chamber is optimum for attaining high light-load engine efficiency. Consequently, heat loss, pumping loss and mechanical friction losses are at a minimum relative to engine power output at low power levels.

As described previously, FIG. 4 is similar to FIG. 3, except that it shows on the abscissa axis a ratio of compression ratio times vehicle weight to combustion chamber volume $Cr(W/d)$, rather than vehicle weight to engine cylinder displacement, W/D. Cr is the maximum compression ratio of the engine and d is the minimum combustion chamber volume of the engine. The ordinate axis of FIG. 4 shows a ratio of engine maximum power output divided by combustion chamber volume, multiplied by compression ratio, rather than engine maximum power output divided by cylinder displacement, in order to have compatible units with the abscissa axis. Consequently, line e corresponds generally to line E in FIG. 3, and has a value of 0.055 kW/kg. All passenger cars shown in FIG. 3 and having a vehicle power to weight ratio greater than 0.055 kW/kg are shown in FIG. 4.

The cost additions of the supercharger, variable compression ratio system, and stronger engine crankshaft and pistons to bear higher loads are largely offset by cost savings realized by producing a much smaller engine. Specifically, significant cost savings can be realized by reducing current engine size by at least one half, using as a base line current high sales volume vehicles, which have a compression ratio times vehicle weight to combustion chamber volume ratio $Cr(W/d)$ of approximately 50000 kg/L as shown in FIG. 4, and a vehicle weight to engine displacement ratio W/D of approximately 600 kg/L as shown in FIG. 3. Most notably, significant cost offsets can be realized by replacing a V6 engine with a small in-line 4 cylinder engine, since an entire cylinder head assembly can be eliminated. Additionally, turbocharging, a generally less expensive type of supercharging, can be used. Consequently, the engine according to the present invention is competitive in price with conventional engines of comparable power. Moreover, a large reduction in engine size is cost effective according to the present invention, in contrast to an incremental reductions in engine size which provides only a small fuel economy benefit without any large cost offsets. The vehicle compression ratio times vehicle weight to combustion chamber volume ratio $Cr(W/d)$ of the present invention is, at a minimum, 100000 kg/L. Referring now to FIGS. 4 and 9, line 36 has a value of 100000 kg/l, and equivalently 0.00001 L/kg. As can be appreciated from FIG. 9, with the variable compression ratio supercharged engine of the present invention, the rate of gain in engine efficiency at light power realizable by engine downsizing increases significantly to the left of line 36, where engine size has been reduced by about one-half as can be seen in FIG. 4.

At high engine loads, a turbocharger delivers a large mass flow of air to the engine. Variable compression ratio is employed to increase the volume of the combustion chamber (s) of the engine at these high power levels in order to minimize stress in the engine and to avoid knock. At maximum power, the duration of high crankshaft loading is significantly increased, whereas the magnitude of maximum loading on the crankshaft is only marginally increased due to the variable compression ratio. Consequently, maximum engine power output is significantly increased with only moderate increase in maximum crankshaft loading. Referring now to FIG. 3, to avoid the necessity of a secondary power source, the supercharged variable compression ratio engine of the present invention will have a power output relative to vehicle weight ratio of at least 0.055 kW/kg.

Yet a further advantage of the present invention is that transient engine knock is substantially avoided. In known variable compression ratio engines, cylinder pressure rises almost immediately following opening of the air intake throttle. In these engines compression ratio cannot be reduced, from approximately 15:1 to 9.5:1, as rapidly as the throttle is opened, and consequently these engines experience transient knock. In the present invention, however, high light-load engine efficiency is attained at a compression ratio of approximately 9.5:1 because of the engine's small size. At a compression ratio of approximately 9.5:1, rapidly opening the throttle does not cause knock. Accordingly, the variable compression ratio mechanism must reduce compression ratio, from, for example from 9.5:1 to 8:1, only as fast as the turbocharger is able to increase boost pressure. A pressure rise lag time is encountered with turbochargers that provides a buffer time for variable compression ratio mechanisms to adjust the engine's compression ratio, so that transient knock is substantially avoided in the present invention. The buffer time in the small engine of the present invention is long enough for permitting transient engine knock to be substantially avoided, but short enough to be not noticed by most drivers. Intercooling the pressure boosted intake air and adjusting the spark timing further increases the buffer time available for reducing compression ratio and, thus, preventing transient knock. A modest increase in peak compression ratio can be accommodated in the present invention with prior art variable compression ratio mechanisms, and this increase in peak compression ratio will provide a small, secondary, level of fuel economy improvement relative to the primary fuel economy benefit attained by greatly reducing engine size.

Exhaust emissions are greatest for conventional engines during the first 120 seconds of engine operation, because combustion is incomplete when the engine is cold, and because the catalytic converter is below its "light off" temperature. The engine of the present invention warms up significantly faster than conventional engines due to its smaller size, lower thermal inertia and higher power loading, or higher brake mean effective pressure. This yields significant reductions in cold start hydrocarbon emissions. Furthermore, as can be appreciated from FIG. 11, the variable compression ratio engine of the present invention has a favorable combustion chamber surface area to volume ratio at light power levels, and thus avoids high heat loss, and consequently high emission levels, at light power levels. Moreover in vehicles with an engine according to the present invention having approximately the same compression ratio as engines not employing variable compression ratio, emissions are also lower on a per mile basis than for known turbocharged and naturally aspirated engines due to the greater fuel economy and lower per mile fuel consumption of the present invention. Consequently, engines according to the present invention have lower hydrocarbon emissions than both conventional engines and known variable compression ratio engines. Furthermore, fuel enrichment, a major source of hydrocarbon emissions in prior art turbocharged engines, is largely avoided in the present invention by further lowering of the compression ratio and increasing engine intercooling. Another approach for eliminating the need for fuel enrichment, water injection, can be installed at low cost relative to the degree of fuel economy improvement that can be attained by engine downsizing, as can be appreciated from FIG. 9. Furthermore, water consumption will typically be very small because high power levels are infrequently used, as can be appreciated from FIG. 1. Yet another approach for eliminating the need for fuel enrichment, ceramic turbines, can be installed at low cost relative to the degree of fuel economy improvement that can be attained by engine downsizing, as can again be appreciated from FIG. 9.

The small size of the engine of the present invention enables the aerodynamics of the vehicle to be improved, which in turn improves fuel economy. The smaller weight of the engine also improves vehicle fuel economy. Hybrid power systems, by comparison, are significantly more expensive, heavier and bulkier than both the power-boosted engine of the present invention and conventional vehicle engines.

A small amount of engine downsizing yields a small benefit in fuel economy. However, the rate of fuel economy improvement increases significantly with greater engine downsizing with the supercharged variable compression ratio engine of the present invention. As can be appreciated from FIG. 9, the fuel economy benefit of engine downsizing tapers off to the left of line 36 for supercharged vehicle engines 90. However, for supercharged vehicle engines with variable compression ratio according to the present invention, line 94, engine efficiency rises rapidly to the left of line 36. The supercharged variable compression ratio engine of the present invention hopes to attain up to approximately 60% better fuel economy than conventional spark ignition vehicle engines in the same automobile. By greatly downsizing the engine for a given vehicle, a significantly improved fuel economy is achieved by the present invention and a favorable cost to benefit ratio is attained.

With the smaller engine according to the present invention, combustion chamber shape is optimum at light loads, and mechanical friction and pumping losses are at a minimum. Moreover, light-load engine efficiency is not strongly dependent on turbocharger or supercharger efficiency because the engine according to the present invention has a high compression ratio and an optimally shaped combustion chamber at light engine loads. Furthermore, exhaust gas recirculation can be employed to further reduce emissions and improve fuel economy.

Variable valve control can be used with the present invention to enhance the performance of the turbocharged spark-ignition engines. With variable valve control, the timing of valve opening, the valve lift and/or the valve opening duration is adjusted to control air intake into the cylinder of the engine and thus control maximum cylinder pressure and engine power. Power and fuel economy are both increased.

DETAILED DESCRIPTION OF THE PREFERRED EMBODIMENTS

Figure 1:
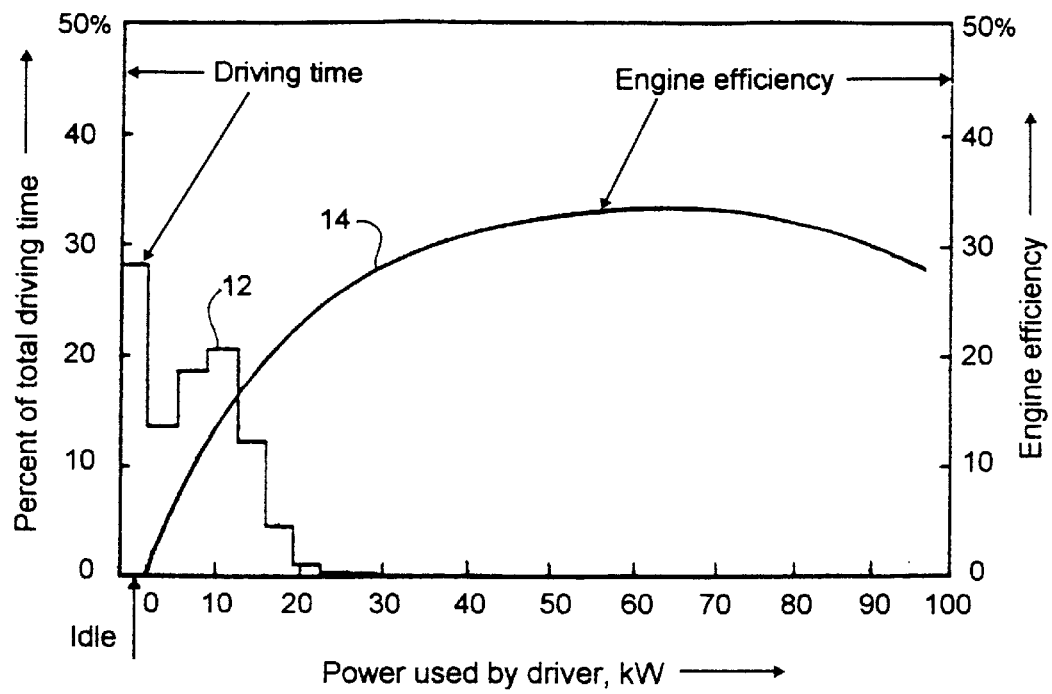
FIG. 1, already described, is a diagram relating the efficiency profile of a typical prior art automobile engine to the approximate percent of total driving time spent at a given power level.
Figure 2:
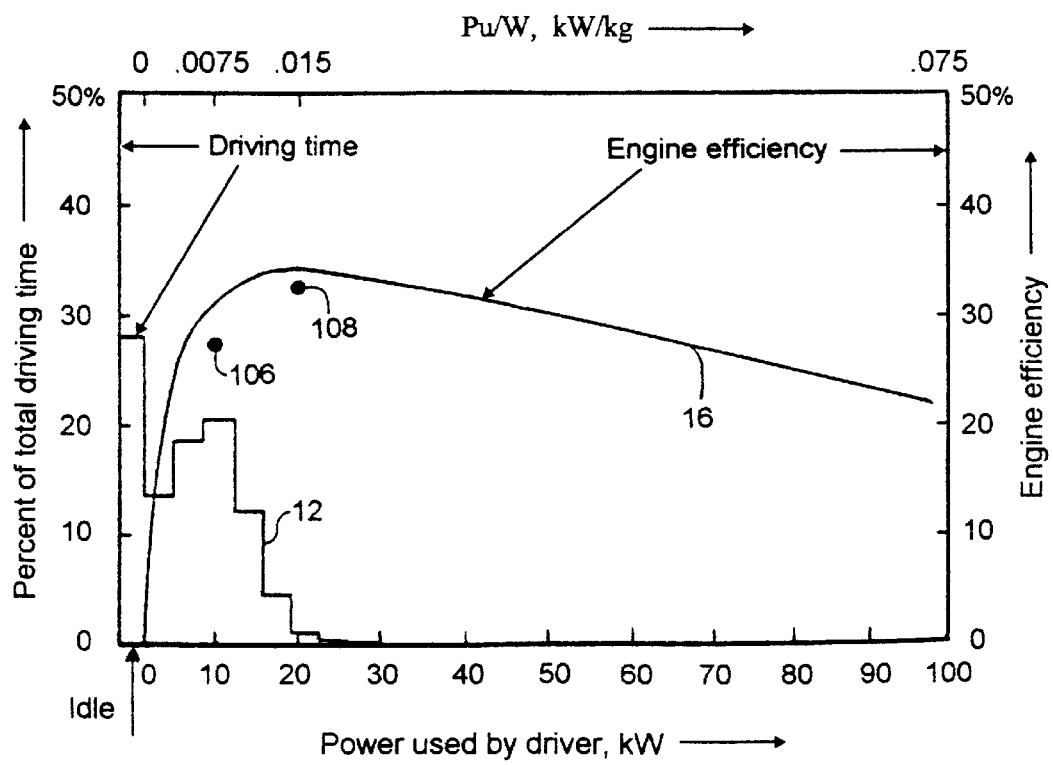
FIG. 2 is a diagram similar to that of FIG. 1 but showing the general engine efficiency profile of the present invention.

The percent of total driving time spent at a given engine power level for a typical driver and typical passenger car is illustrated by the stepped curve 12 in FIGS. 1 and 2. The maximum power of new cars sold in the United States, on average is approximately 100 kilowatts. The general efficiency profile of a typical prior art 100 kilowatt engine is represented by the curve 14 in FIG. 1. The general efficiency profile of a 100 kilowatt engine according to the present invention is represented by the line 16 in FIG. 2. In FIGS. 1 and 2, engine power output is shown on the abscissa axis. The percent of total driving time spent at a given engine power level is read from the left ordinate axis. Brake engine efficiency is read from the right ordinate axis. The cylinder displacement and combustion chamber volume of the engine according to the present invention are much smaller than those of a conventional engine having the same maximum power output. By comparing FIGS. 1 and 2, it can be seen that reducing engine cylinder displacement and reducing combustion chamber volume relative to vehicle weight according to the present invention shifts the efficiency profile of the engine to the left, thereby providing greater engine efficiency at light power levels. It can also be seen that the engine is significantly more efficient than typical engines at the power levels at which the engine operates most of the time. The greater efficiency occurs at every power level in at least the lower fourth in the range of power levels the engine is capable of producing. A small, optimally shaped combustion chamber volume is employed at light power levels to attain high fuel economy. Supercharging and variable compression ratio are employed to satisfy maximum power requirements without compromising light load engine efficiency. The power-boosted engine attains approximately the same fuel economy as hybrid vehicle's primary engine in the same automobile, but at significantly less cost, complexity, weight and bulk than the hybrid system.

Figure 3:
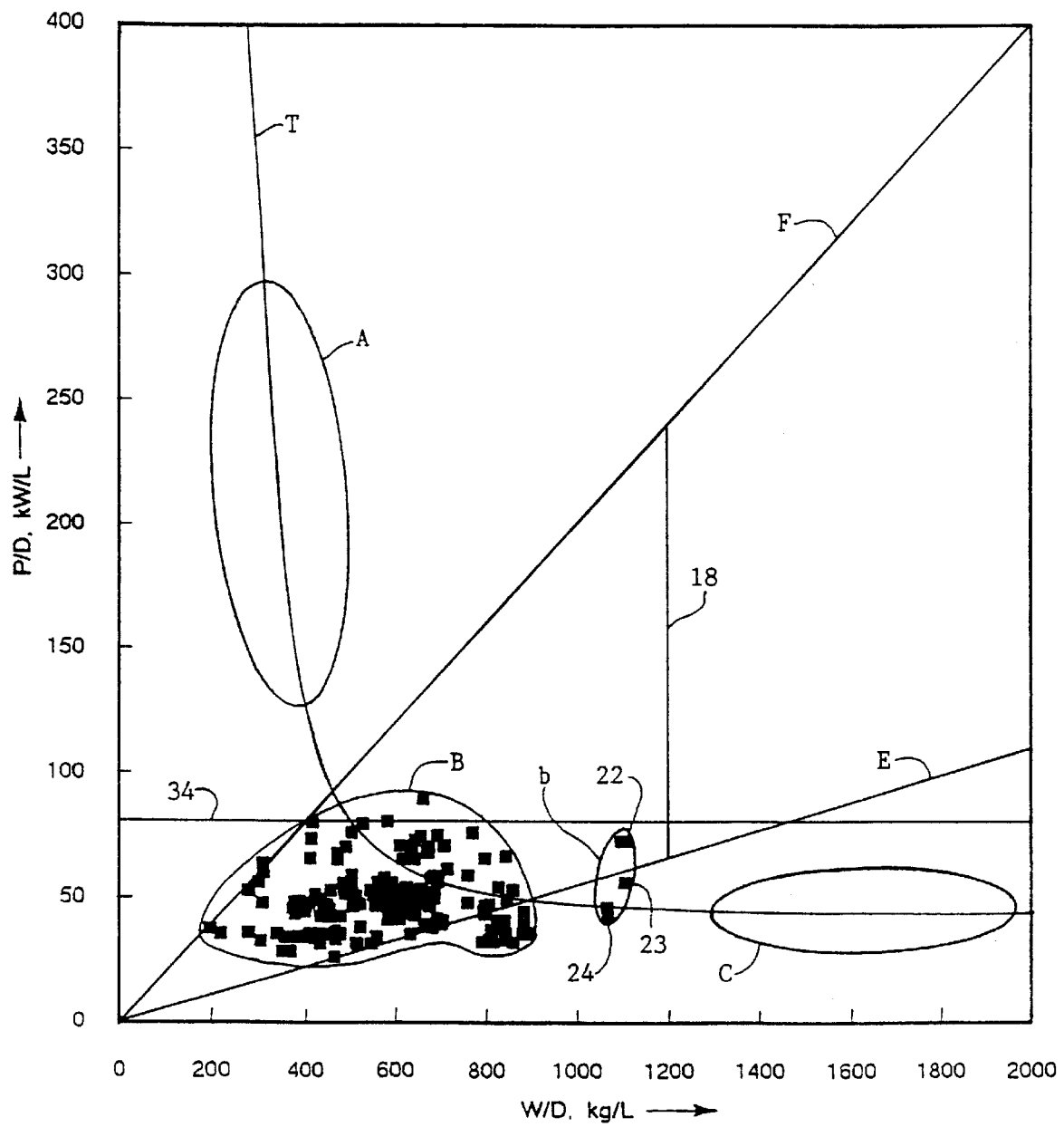
FIG. 3, already described, is a diagram showing engine power relative to engine displacement and automobile weight for various automobiles.
Figure 4:
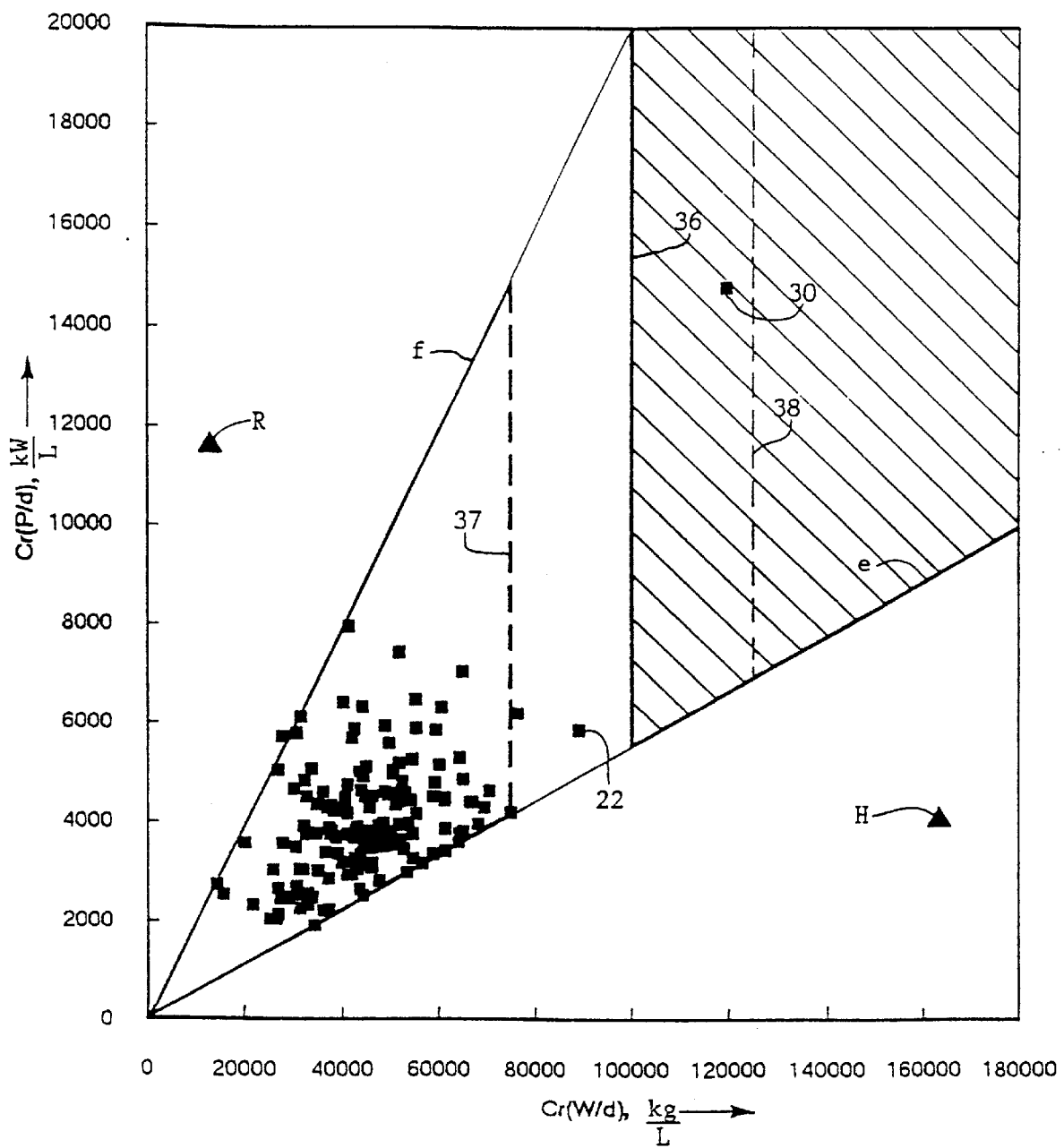
FIG. 4 already described, is a diagram similar to that of FIG. 3 and showing the scope of the present invention.

FIGS. 3 and 4 show generally engine size relative to vehicle weight for various types of vehicles. Referring now to FIG. 3, vehicle weight divided by engine cylinder displacement, W/D in units of kilograms per liter, is shown on the abscissa axis. Engine maximum power output divided by engine cylinder displacement, P/D in units of kilowatts per liter, is shown on the ordinate axis. A vehicle weight to displacement ratio of 0.055 kW/kg, represented by line E, is generally the lower bound of power and thus acceleration for automobiles sold today in the United States. Some very low power European city cars fall below line E. A vehicle power to weight ratio of 0.20 kW/kg is represented by the line F, which is generally the upper boundary of a power to weight ratio and, thus, a upper boundary of acceleration for vehicles sold in volume today. Race and exotic performance cars are in area A. Conventional production passenger cars are in area B and Japanese micro-size cars fall in area b. Dots 22, 23 and 24 represent specific micro-size vehicles designed to satisfy certain Japanese legal requirements relating to limited parking space, vehicle size, and engine displacement and power limitations. Dot 22 represents a naturally aspirated engine, and falls to the right of line 37 in FIG. 4. Dots 23 and 24 represent turbocharged engines and fall to the left of line 37 in FIG. 4 (not numbered in FIG. 4). The other dots represent actual production passenger cars. Virtually all passenger cars sold world wide having a vehicle weight to power ratio greater than 0.055 kW/kg are in areas B and b of FIG. 3. Line T represents the historical trade-off of power vs. efficiency for vehicle engines, from vehicles having high fuel economy on the lower right to vehicles having high performance in the upper left corner of the diagram. Area C shows hybrid engine size relative to vehicle weight. As can be seen, hybrid size engines are too far to the right on trade-off line T to provide acceptable vehicle acceleration. Consequently, in hybrid vehicles a secondary engine is employed to provide added power.

Vertical line 18 represents a vehicle weight to engine displacement ratio of 1200 kg/L. Vehicles engines to the right of line 18 according to the present invention include supercharging and variable compression ratio.

Vehicles according to the present invention have high fuel economy due to their small combustion chamber volume and large compression ratio at light loads. FIG. 4 is similar to FIG. 3, except that it shows on the abscissa axis a ratio of compression ratio times vehicle weight to combustion chamber volume, rather than vehicle weight to engine cylinder displacement, Cr is the maximum compression ratio of the engine and d is the minimum combustion chamber volume of the engine. The ordinate axis of FIG. 4 shows a ratio of engine compression ratio times maximum power output divided by combustion chamber volume, rather than engine maximum power output divided by cylinder displacement in order to have compatible units with the abscissa axis. Consequently, line e corresponds generally to line E in FIG. 3, and has a value of 0.055 kW/kg. Similarly, line f corresponds generally to line F in FIG. 3, and has a value of 0.20 kW/kg. The dot 30 represents one vehicles according to the present invention. Dot H represents a hybrid vehicle's primary engine; and dot R represents a high performance race car engine. All passenger cars shown in FIG. 3 and having a vehicle power to weight ratio of at least 0.055 kW/kg are shown in FIG. 4.

Vertical line 37 represents a compression ratio times vehicle weight to combustion chamber volume ratio, Cr(W/d), of 75000 kg/L. Supercharged vehicle engines fall to the left of line 37, and there are no, or virtually no, supercharged passenger cars sold world wide to the right of line 37 and having an engine maximum power to vehicle weight ratio of at least 0.055 kW/kg. Vertical line 36 shown in FIG. 4 represents a vehicle engine compression ratio times vehicle weight to combustion chamber volume ratio of 100000 kg/L. Vehicles engines to the right of line 36 in FIG. 4 according to the present invention include supercharging and variable compression ratio. These vehicle engines have high fuel economy due to their small combustion chamber volume and high compression ratio at light power levels, while also having high power, and therefore good acceleration, due to supercharging and variable compression ratio. Moreover, these variable compression ratio engine vehicles have fewer pistons and associated components and/or significantly smaller size. Accordingly, these vehicles can be manufactured at competitive cost.

Vehicles according to the present invention include supercharging and variable compression ratio, and have a compression ratio times vehicle weight to engine combustion chamber volume ratio, Cr(W/d), of at least 100000 kg/L, and an engine maximum power to vehicle weight ratio of at least 0.055 kW/kg. Thus, the vehicles according to the present invention lie in the crosshatched area in FIG. 4.

As can be appreciated from prior art FIG. 3, no, or virtually no, vehicles are sold anywhere that have a power to engine displacement ratio P/D greater than 80 kW/L, represented by line 34, and a vehicle weight to engine displacement ratio greater than 900 kg/L. This is because above approximately 80 kW/L supercharging is generally required to attain high power output, and the cost of the supercharging equipment adds significantly to the cost of the engine. Moreover, the supercharging equipment is expensive relative to the small fuel economy improvement realized by downsizing of these prior art engines. Consequently, while supercharging is employed to attain high performance in cars that have a vehicle weight to engine displacement ratio less than 900 kg/L, no or virtually no passenger cars are sold anywhere that have an vehicle weight to engine displacement ratio greater than 900 kg/L and a power to engine displacement ratio greater than 80 kg/L, because the cost to fuel economy benefit of supercharging prior art engines is poor.

Figure 9:
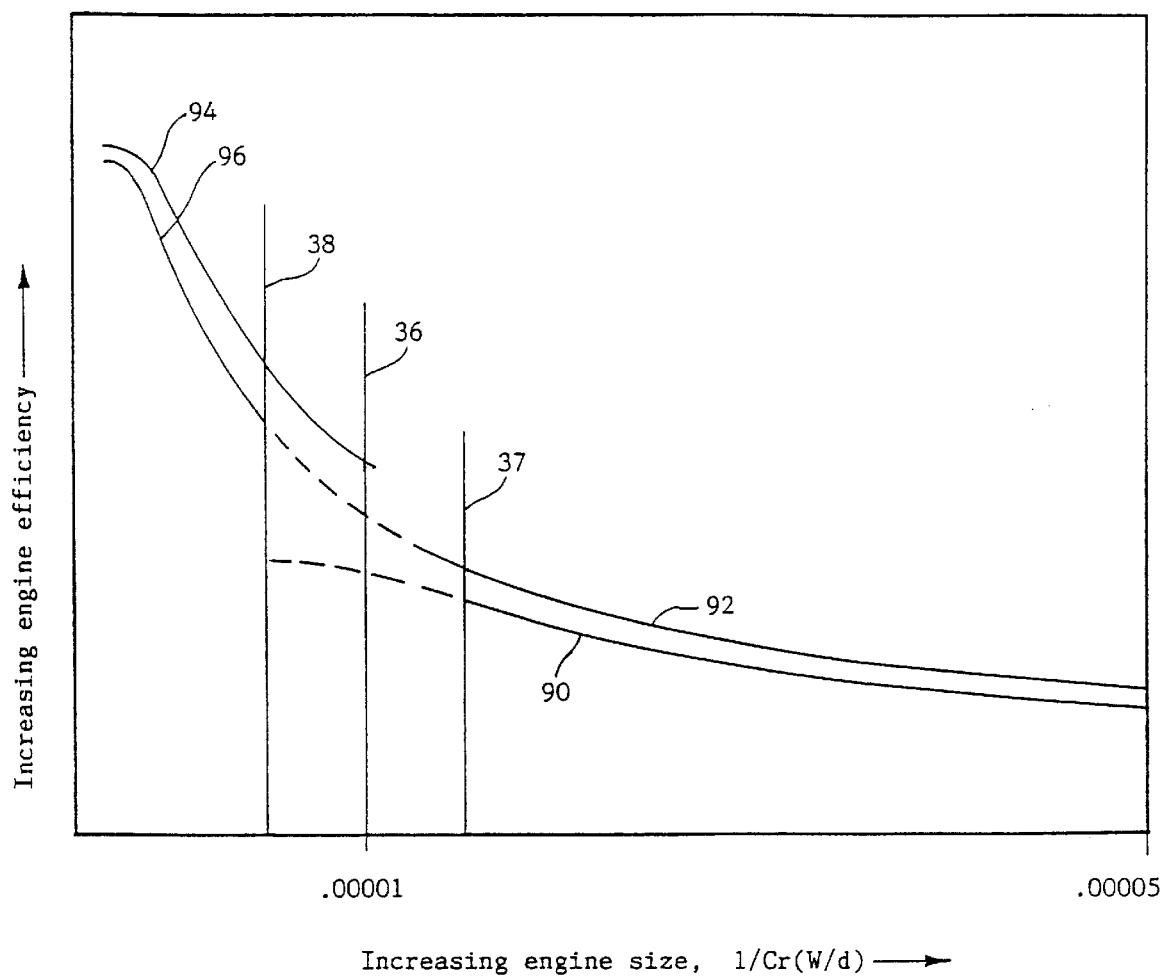
FIG. 9, already described, is a diagram relating engine size to light-load engine efficiency.

FIG. 9 shows generally the improvement in light-load engine efficiency, and thus fuel economy, realized by reducing the size of various engines in a vehicle of a given weight. The horizontal axis of FIG. 9 shows 1/Cr(W/d), which is the inverse of the property shown on the horizontal axis of FIG. 4. The vertical axis of FIG. 9 shows engine efficiency at a light power level. The approximate efficiency of naturally aspirated vehicle engines sold today in the United States is indicated by line 92, and the approximate efficiency of supercharged vehicle engines sold today in the United States is indicated by line 90. As can be appreciated from lines 92 and 90, engine efficiency increases and, therefore, fuel economy improvements realized from downsizing an engine in a vehicle of a certain weight are initially very small. This small rate of fuel economy improvement has been reported by the National Research Council and others, discussed previously. Furthermore, for each additional incremental reduction of engine size the fuel economy benefit becomes smaller than the preceding incremental reduction for supercharged engines as represented by a dashed line to the immediate left of line 90. This is due to further reduction of compression ratio and/or only moderate efficiency of commercially available superchargers.

However, for supercharged engines in which a variable compression ratio is employed, indicated by line 94, the light-load engine efficiency increases, and thus the light-load fuel economy improvements increase substantially with each incremental reduction in engine size. Furthermore, the variable compression ratio provides moderately greater efficiency at all power levels than spark-ignition hybrid vehicle primary engines 96.

As can be appreciated from FIG. 9, the fuel economy benefit of engine downsizing tapers off to the left of line 36 for supercharged vehicle engines 90. However, for supercharged vehicle engines with variable compression ratio according to the present invention, line 94, engine efficiency rises rapidly to the left of line 36. The difference in slope of lines 90 and 94 is even more pronounced to the left of line 38. Vertical line 38 represents a compression ratio times vehicle weight to combustion chamber volume ratio, Cr(W/d), of 125,000 kg/L. Referring now to FIGS. 4 and 9, hybrid vehicle engines, described previously, typically have a Cr(W/d) value of at least 125000 kg/L. Accordingly, vehicle engines according to the present invention having a Cr(W/d) value greater than 125000 kg/L have much better fuel economy than conventional vehicle engines.

Figure 5:
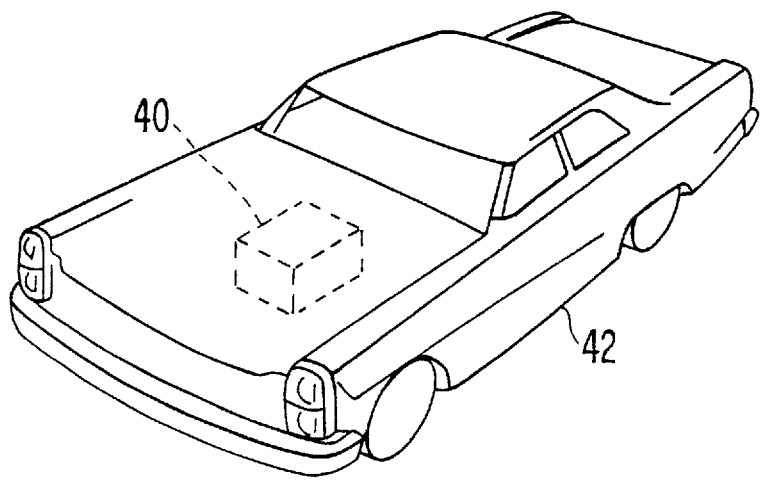
FIG. 5 is an automobile embodying the present invention.

FIG. 5 illustrates a size-optimized internal combustion engine system according to the present invention in which engine 40 is housed in vehicle 42. Engine 40 has a geometric cylinder displacement D, which is the total swept displacement of all of the firing cylinders of the engine, a minimum combustion chamber volume d, which is the minimum total clearance volume of all of the firing cylinders of the engine, and a maximum engine power output value P. The vehicle 42 has a curb weight W, which is the weight of the vehicle without passengers, cargo and fuel. The vehicle 42 may be a passenger car or light truck, such as a pickup truck, or a multi-purpose vehicle, such as a mini van or a sports-utility vehicle, and has a curb weight of no more than 2000 kilograms. The power of the engine 40 is transmitted by a transmission to the drive wheel or drive wheels of the vehicle 42.

Figure 6:
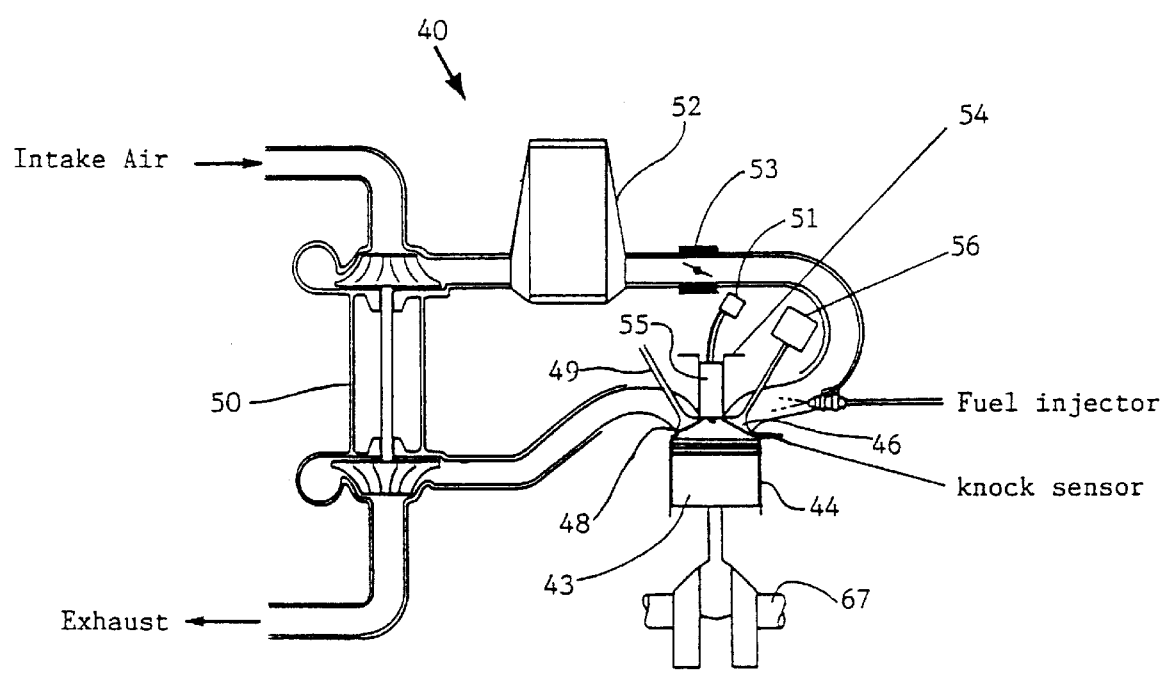
FIG. 6 shows schematically a portion of the present invention.

FIG. 6 shows schematically a portion of the engine 40. A piston 43 is slidably housed within a cylinder 44 which is provided with an air/fuel mixture via an intake valve 46, which is housed in a cylinder head 48, it being understood that engine 40 can include multiple pistons. Engine 40 is equipped with a turbocharger 50, an optional intercooler 52, a spark plug 55, one or more exhaust valves 49, and a compression ratio adjustment mechanism 54 to vary the combustion chamber volume and the compression ratio of engine 40. Those skilled in the art will appreciate that the system according to the present invention can be use with other types of variable compression ratio mechanisms. Engine 40 may include a controller, CPU or ECU 51 for controlling the compression ratio of engine 40. Air flow into engine 40 can be controlled by a throttle plate 53 or other arrangement. The intake valve 46 may include an adjustable actuation mechanism 56 for controlling air flow into the cylinder 44. Engine 40 can be used with one or more intake and exhaust valves. The system according to the present invention can be used with a waste gate and with one or more turbochargers or other type of supercharger. The geometric cylinder displacement D of engine 40 is equal to the product of the full stroke of piston 43 in cylinder bore 44 times the cross-sectional area of cylinder bore 44 times the number of pistons in the engine 40. Engine 40 has a maximum compression ratio Cr and a minimum combustion chamber volume d which are employed during normal operation of the engine to attain high fuel economy. Those skilled in the art will appreciate that engine 40 can have different size pistons and cylinders, and the displacements, volumes and compression ratio of the engine 40 can be calculated individually for each firing cylinder. The piston 42 is connected to a crankshaft 57 in a conventional manner or by other functional arrangement.

Figure 10:
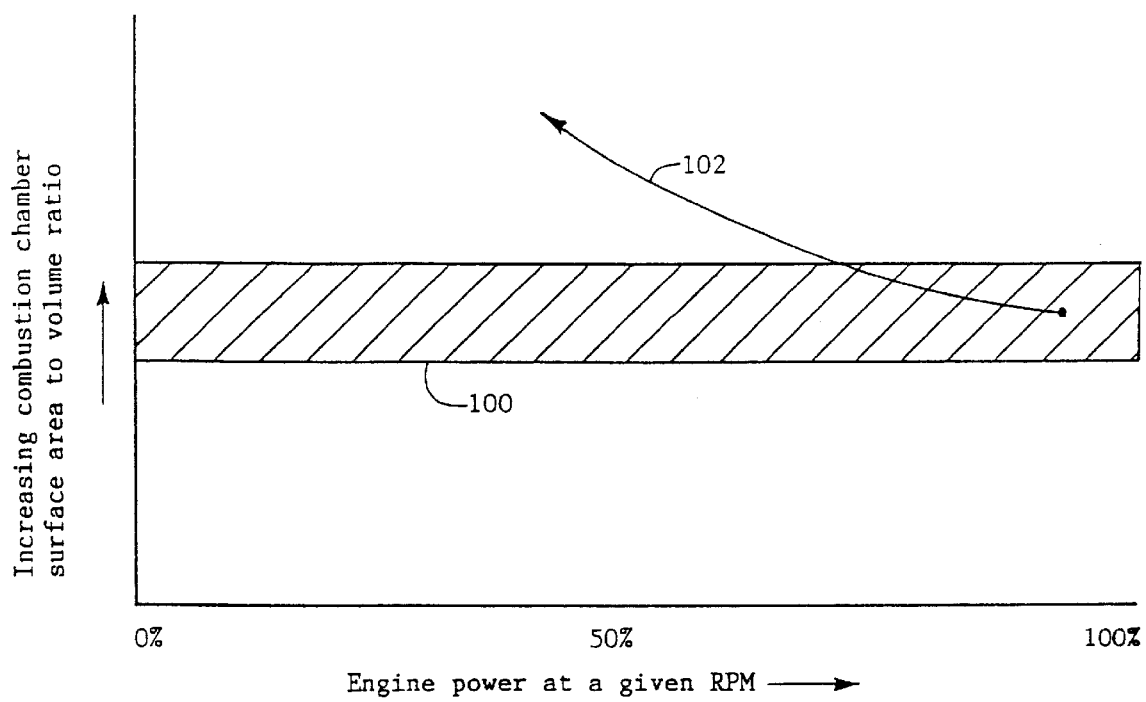
FIG. 10, already described, is a diagram relating the combustion chamber surface area of prior art variable compression ratio engines to percent of engine power output at a certain RPM, and FIG. 11 Already described, is a diagram similar to that of FIG. 10 but shows generally combustion chamber surface area relative to engine power output of the present invention.

Prior art FIG. 10 shows the ratio of combustion chamber surface area to combustion chamber volume on the vertical axis, and engine power output at a certain engine speed on the horizontal axis. Combustion chamber surface area and volume are measured when piston 43 is at top dead center. The surface area to combustion chamber volume ratio of typical vehicle engines is represented by cross hatched box 100. In FIG. 10 the surface area to combustion chamber volume ratio of a prior art variable compression ratio engine is represented by line 102. As can be appreciated from FIG. 10, at light power levels, the combustion chamber surface area to volume ratio for these engines increases to a value significantly above that of typical vehicle engines 100, which results in increased heat loss from the combustion chamber, which adversely effects vehicle fuel economy.

Figure 11:
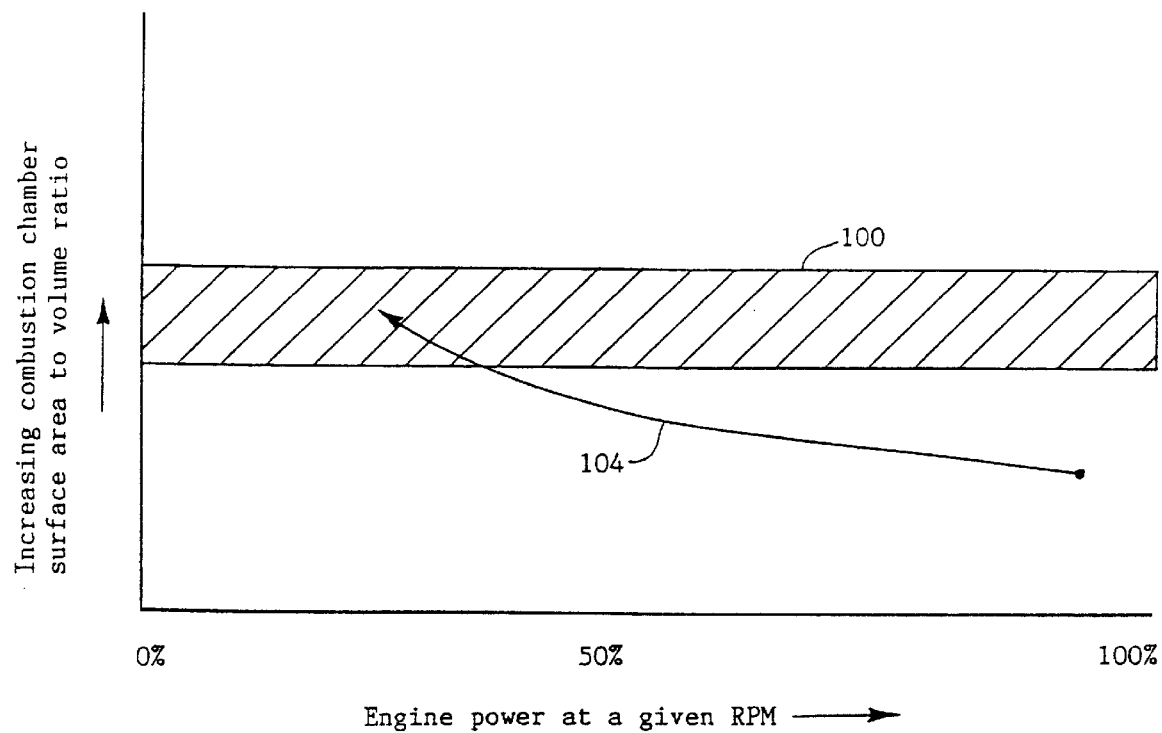

In FIG. 11 the surface area to combustion chamber volume ratio of a variable compression ratio supercharged engine according to the present invention is represented by line 104. As can be appreciated from FIG. 11, at light power levels, e.g. less than 50% of full power at a given engine speed, the combustion chamber surface area to volume ratio for the engine according to the present invention 104 increases to a value approximately equal to that of typical vehicle engines 100. Consequently, the engine according to the present invention avoids abnormally high heat loss from the combustion chamber.

Due to its small cylinder displacement and small combustion chamber volume, at light power levels, the engine according to the present invention will operate approximately as efficiently as a hybrid vehicle's primary engine. The combustion chamber has a favorable surface area to volume ratio and the geometry of the chamber is optimum for attaining high light-load engine efficiency. Moreover and consequently, mechanical friction and heat loss are at a minimum relative to engine power output.

At high power levels, the turbocharger 50 and the variable compression ratio mechanism 54 are employed to increase the maximum power output of the engine 40. At high loads, the turbocharger 50 delivers a large mass flow of air to engine 40. The variable compression ratio mechanism 54 is employed to increase the volume of the combustion chamber in order to avoid engine knock and/or to limit the maximum pressure of the combustion charge.

Figure 7:
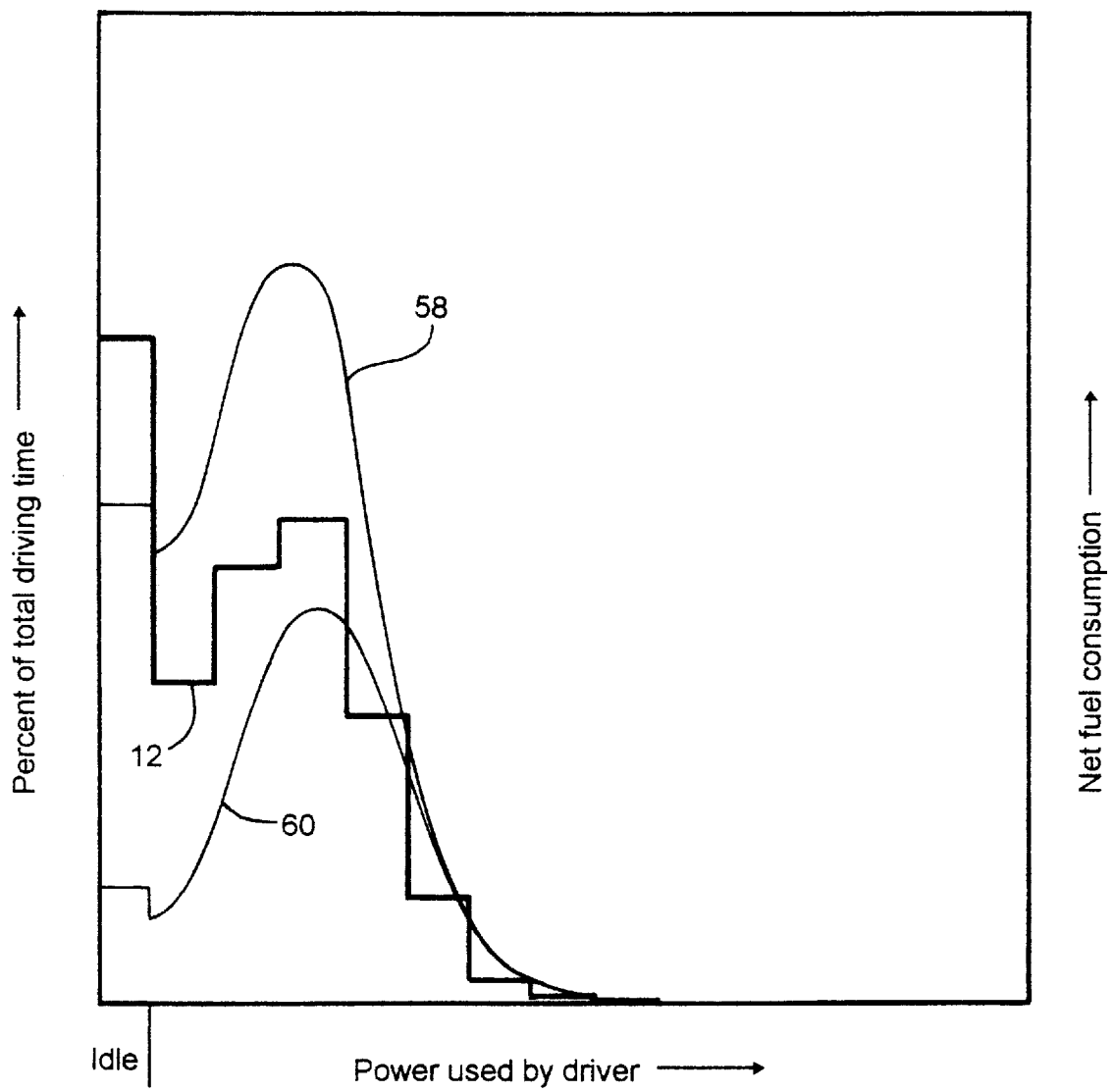
FIG. 7 is a diagram showing approximate fuel consumption levels of the present invention relative to engine power output.

As can be seen in FIG. 7, the fuel economy benefit of engine and combustion chamber size reduction is significant. The percent of total driving time spent at a given engine power level for a typical driver and typical passenger car is illustrated by the stepped curve 12 (also shown in FIG. 2) which is read from the left ordinate axis. Engine power output is read from the horizontal axis. Line 58 indicates the net fuel consumption of the prior art engine represented by line 14 in FIG. 1. Line 60 represents net fuel consumption of the present invention represented by line 16 in FIG. 2. Net fuel consumption is read from the right ordinate axis. The area between the line 58 and 60 is an indication of the fuel savings of the engine of the present invention over the prior art engine. The variable compression ratio supercharged engine of the present invention hopes to attain up to approximately 100% better fuel economy than typical spark ignition vehicle engines in the same automobile, and up to approximately 60% better fuel economy than the most efficient spark ignition passenger car engines sold today.

As can be seen from FIG. 2, the engine 40 according to the present invention operates at high efficiency at light loads. This is due to its small size and relatively small internal engine friction losses at light loads. Furthermore, as can be seen from FIG. 8, the variable compression ratio mechanism 54 (FIG. 6) is employed at light power levels to further increase compression ratio and, thus, further increase thermodynamic efficiency. Engine power actually used by the vehicle driver divided by vehicle weight, Pu/W, in units of kilowatts per kilogram is shown on the horizontal axis of FIG. 8, and engine compression ratio is shown on the vertical axis. At power levels below 0.0075 kW/kg, e.g. Zone 1, the engine according to the present invention has a compression ratio greater than 11:1 in order to attain high light load efficiency. Furthermore, typically in Zone 1, no boost pressure is supplied to engine 40. The value of 0.055 kW/kg on the horizontal axis of FIG. 8 corresponds to line E in FIG. 3, which indicates generally the minimum power capability and thus acceleration for passenger car vehicle engines sold today in the United States. At power levels greater than 0.055 kW/kg, the turbocharger 50 and the variable compression ratio mechanism 54 are employed to increase the maximum power output of the engine 40. At high loads, the turbocharger 50 delivers boost pressure and a large mass flow of air to the engine 40. The variable compression ratio mechanism 54 is employed to increase the volume of the combustion chamber in order to avoid engine knock and/or to limit the maximum pressure of the combustion charge. At power levels above 0.055 kW/kg, e.g. Zone 2, the engine according to the present invention, operating on regular unleaded 87 octane gasoline, using the (R+M)/2 octane determination method, has a compression ratio less than 8.5:1. Higher octane fuels and improved combustion chamber design enable higher compression ratios to be employed in both Zone 1 and Zone 2. In general, in order to provide high light load efficiency and sufficient maximum power without engine knock, the compression ratio will be at least 2.5 points lower at the ratio of 0.055 kilowatts of power actually used per kilogram of vehicle weight than at 0.0075 kilowatts of power actually used per kilogram of vehicle weight, e.g. a compression ratio of 11:1 in Zone 1 will be reduced at least to a compression ratio of 8.5 in Zone 2.

Figure 8:
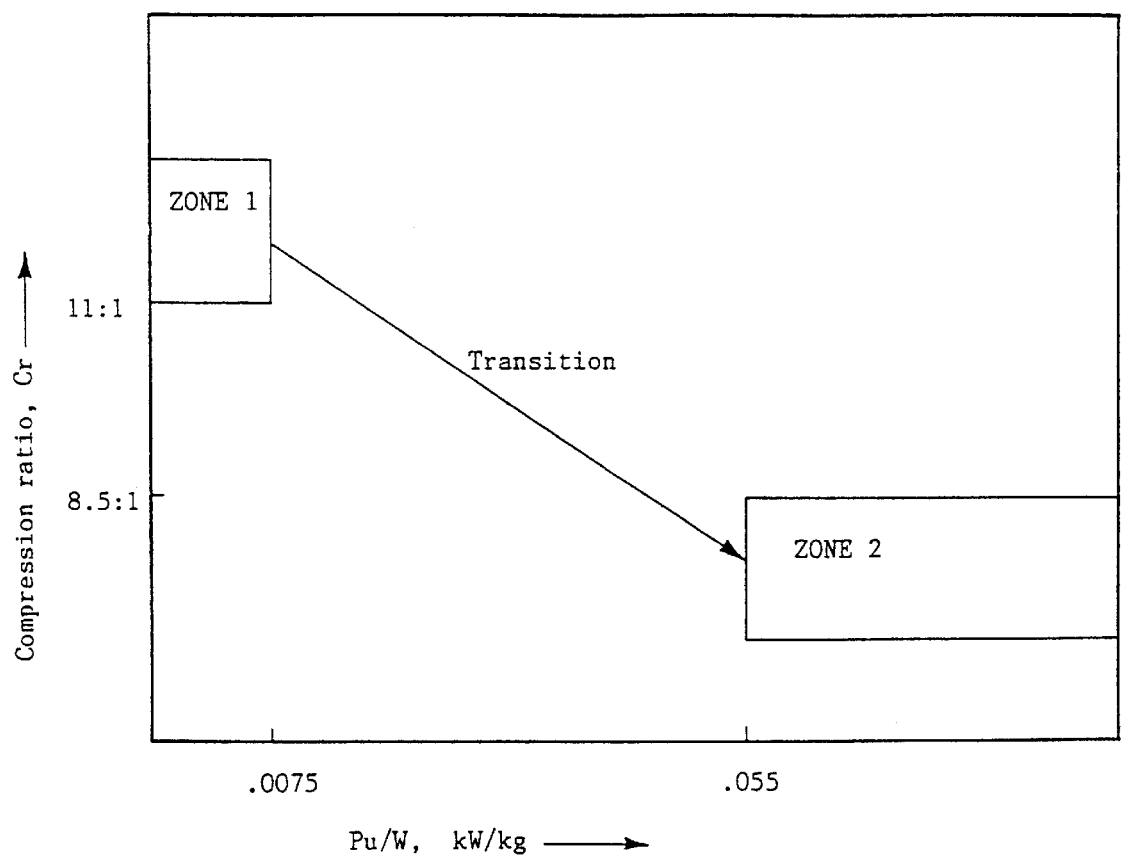
FIG. 8 is a diagram showing adjustment of compression ratio for increasing light load vehicle fuel economy according to the present invention.

The horizontal axis of FIG. 8 is shown on the upper horizontal axis of FIG. 2. Dot 106 indicates an engine efficiency of 27% at a power to vehicle weight ratio Pu/W of 0.0075 kW/kg, and dot 108 indicates an engine efficiency of 32% at a power to vehicle weight ratio Pu/W of 0.015 kW/kg. FIG. 2 shows brake engine efficiency calculated using the lower heating value of the fuel and the brake power of the engine. Vehicle engines having variable compression ratio, according to the present invention, represented generally by line 16 have a light load efficiency greater than 27% at a Pu/W level less than 0.0075 kW/kg. Similarly, vehicle engines according to the present invention represented generally by line 16 have a light load efficiency greater than 32% at a Pu/W level less than 0.015 kW/kg.

As can be appreciated from FIG. 9, engine efficiency increases and, therefore, fuel economy improvements realized from downsizing a vehicle engine in a vehicle of a certain weight are initially very small. Furthermore, the efficiency increases realized from downsizing a turbocharged engine become smaller, and of less or no value, with each incremental reduction of engine size. Consequently, the cost to benefit ratio of engine downsizing with turbocharging is poor.

However, for turbocharged engines in which variable compression ratio is employed, the light-load fuel economy improvements increase substantially with each incremental reduction in engine displacement.

While the invention has been described in terms of a single preferred embodiment, those skilled in the art will recognize that the invention can be practiced with modification within the spirit and scope of the claims.

It is claimed:

1. A high-efficiency vehicle comprising:

a body; and a reciprocating piston four-stroke spark-ignition internal combustion engine connected to said body to provide power for moving the vehicle, said engine having a combustion chamber volume, a compression ratio having a maximum, a maximum power output, means for supercharging the engine, and means for varying the compression ratio, wherein the vehicle has a weight, a ratio of maximum compression ratio times weight to combustion chamber volume of at least 100,000 kilograms per liter, and an engine maximum power output to weight ratio of at least 0.055 kilowatts of engine power per kilogram of weight, wherein the engine has an efficiency greater than 27% at a ratio of the actual power being used to the weight of the vehicle less than 0.0075 kilowatts per kilogram of vehicle weight.

2. A high-efficiency vehicle comprising:

a body; and a reciprocating piston four-stroke spark-ignition internal combustion engine connected to said body to provide power for moving the vehicle, said engine having an engine cylinder displacement volume, a compression ratio, a maximum power output, means for supercharging the engine, and means for varying the compression ratio, wherein the vehicle has a weight, a ratio of weight to engine cylinder displacement volume of at least 1,200 kilograms of weight per liter of engine cylinder displacement and an engine maximum power output to weight ratio of at least 0.055 kilowatts of engine power per kilogram of weight.

3. The high-efficiency vehicle of claim 2, wherein the engine is the only motive power source of the vehicle.

4. A high-efficiency vehicle comprising:

a body; and a reciprocating piston four-stroke spark-ignition internal combustion engine connected to said body to provide power for moving the vehicle, said engine having a combustion chamber volume, a compression ratio having a maximum, a maximum power output, means for supercharging the engine, and means for varying the compression ratio, wherein the vehicle has a weight, a ratio of maximum compression ratio times weight to combustion chamber volume of at least 100,000 kilograms per liter, and an engine maximum power output to weight ratio of at least 0.055 kilowatts of engine power per kilogram of weight, wherein the engine has an efficiency greater than 32% at a ratio of the actual power being used to the weight of the vehicle less than 0.015 kilowatts per kilogram of vehicle weight.

5. A variable compression ratio system for high-efficiency spark-ignition reciprocating piston engine vehicles including means for supercharging and means for adjusting the compression ratio of the engine, wherein the means for adjusting the compression ratio provides a compression ratio greater than 11:1 at a ratio of the actual power being used to the weight of the vehicle of less than 0.0075 kilowatts per kilogram of vehicle weight, and provides a compression ratio less than 8.5:1 at ratios of the actual power being used to the weight of the vehicle greater than 0.055 kilowatts per kilogram of vehicle weight.

6. A variable compression ratio system for high-efficiency spark-ignition reciprocating piston engine vehicles including means for supercharging and means for adjusting the compression ratio of the engine, wherein the means for adjusting the compression ratio provides a compression ratio greater than 11:1 at a ratio of the actual power being used to the weight of the vehicle of less than 0.0075 kilowatts per kilogram of vehicle weight, and provides a compression ratio less than 8.5:1 at ratios of the actual power being used to the weight of the vehicle greater than 0.055 kilowatts per kilogram of vehicle weight, wherein the means for supercharging provides no boost pressure below the ratio of 0.0075 kilowatts of power actually being used per kilogram of vehicle weight, and provides positive boost pressure at ratios greater than 0.055 kilowatts of power actually being used per kilogram of vehicle weight.

7. A method for increasing the efficiency of a reciprocating piston four-stroke spark-ignition internal combustion engine at lower power levels in the range of power levels the engine is capable of producing, wherein the engine has a combustion chamber volume and a compression ratio having a maximum, comprising:

placing the engine in a vehicle in which the ratio of maximum compression ratio times vehicle weight to combustion chamber volume is at least 100,000 kilograms per liter and an engine maximum power output to weight ratio is at least 0.055 kilowatts of engine power per kilogram of vehicle weight;

supercharging the engine; and varying the compression ratio, wherein the compression ratio is reduced from a value greater than 11:1 at 0.0075 kilowatts of power actually being used per kilogram of vehicle weight to a value less than 8.5:1 at 0.055 kilowatts of power actually being used per kilogram of vehicle weight.

8. The method of claim 7 wherein the supercharging provides no boost pressure below the ratio of 0.0075 kilowatts of power actually being used per kilogram of vehicle weight, and the supercharging provides positive boost pressure at ratios greater than 0.055 kilowatts of power actually being used per kilogram of vehicle weight.

9. A high-efficiency vehicle comprising:

a body; and a reciprocating piston four-stroke spark-ignition internal combustion engine connected to said body to provide power for moving the vehicle, said engine having a combustion chamber volume, a compression ratio having a maximum, a maximum power output, means for supercharging the engine, and means for varying the compression ratio, wherein the vehicle has a weight, a ratio of maximum compression ratio times weight to combustion chamber volume of at least 100,000 kilograms per liter, and an engine maximum power output to weight ratio of at least 0.055 kilowatts of engine power per kilogram of weight, wherein the engine has an efficiency greater than 32% at a power level less than 20 kilowatts.

* * * * *